US009645251B1

(12) United States Patent
Gibbons

(10) Patent No.: US 9,645,251 B1
(45) Date of Patent: May 9, 2017

(54) ESTIMATION OF ROLL AND ROLL RATE OF A SPINNING BODY BASED ON A SIGNAL RECEIVED FROM A REMOTE TRANSMITTER

(71) Applicant: Exelis Inc., McLean, VA (US)

(72) Inventor: Gregory A. Gibbons, Thousand Oaks, CA (US)

(73) Assignee: Exelis Inc., McLean, VA (US)

( * ) Notice: Subject to any disclaimer, the term of this patent is extended or adjusted under 35 U.S.C. 154(b) by 557 days.

(21) Appl. No.: 14/225,616

(22) Filed: Mar. 26, 2014

(51) Int. Cl.
*G01S 19/53* (2010.01)
*G01P 3/481* (2006.01)
*F41G 7/30* (2006.01)
*F41G 7/34* (2006.01)

(52) U.S. Cl.
CPC ............. *G01S 19/53* (2013.01); *F41G 7/306* (2013.01); *F41G 7/346* (2013.01); *G01P 3/481* (2013.01)

(58) Field of Classification Search
CPC ....... G01S 19/53; G01S 19/54; G01C 21/165; G01C 21/025; F41G 7/21; F41G 7/2246; F41G 7/30; F41G 7/2206; F41G 7/306; F42B 15/01
See application file for complete search history.

(56) References Cited

U.S. PATENT DOCUMENTS

| 6,128,557 | A * | 10/2000 | Fenton | G01S 19/14 |
| | | | | 342/357.59 |
| 6,520,448 | B1 * | 2/2003 | Doty | F42B 15/01 |
| | | | | 244/3.1 |
| 6,779,752 | B1 * | 8/2004 | Ratkovic | F41G 7/346 |
| | | | | 244/3.1 |
| 7,994,971 | B2 | 8/2011 | Velde et al. | |
| 8,106,811 | B2 * | 1/2012 | Vander Velde | F41G 7/222 |
| | | | | 342/16 |
| 8,269,667 | B2 | 9/2012 | Vander Velde et al. | |
| 2004/0188561 | A1 * | 9/2004 | Ratkovic | F41G 7/346 |
| | | | | 244/3.15 |
| 2005/0122261 | A1 * | 6/2005 | Kim | G01S 19/24 |
| | | | | 342/357.63 |
| 2007/0023567 | A1 * | 2/2007 | Lindquist | F41G 7/305 |
| | | | | 244/3.1 |
| 2008/0062042 | A1 * | 3/2008 | O'Brien | G01S 19/53 |
| | | | | 342/357.36 |

(Continued)

*Primary Examiner* — Gregory C Issing
*Assistant Examiner* — Daniel P Malley, Sr.
(74) *Attorney, Agent, or Firm* — Edell, Shapiro & Finnan LLC

(57) ABSTRACT

A receiver determines a roll rate of a spinning projectile that receives a signal from a satellite or terrestrial transmitter at a directional antenna fixed to the projectile. The receiver tracks a code phase and a rate of change thereof of the received signal relative to a local model signal corresponding to the transmitter. A roll correlator of the receiver correlates the received signal with the model signal based on (i) the tracked code phase and rate, and (ii) a roll-correlator integration time assumed to produce a predetermined number N of correlation samples per revolution of the antenna, to produce sequential correlation samples for each of successive revolutions of the antenna. The receiver determines a time difference between successive periods of observed signal reception based on the correlation samples, and determines a roll rate based on the time difference.

19 Claims, 5 Drawing Sheets

(56) References Cited

U.S. PATENT DOCUMENTS

| | | | |
|---|---|---|---|
| 2010/0052981 A1* | 3/2010 | Alexander | G01S 19/53 342/357.36 |
| 2010/0117894 A1 | 5/2010 | Velde et al. | |
| 2010/0289687 A1 | 11/2010 | Vander Velde et al. | |
| 2012/0068884 A1 | 3/2012 | Vander Velde et al. | |
| 2013/0169477 A1 | 7/2013 | Luo et al. | |

\* cited by examiner

ESTIMATION OF ROLL AND ROLL RATE OF A SPINNING BODY BASED ON A SIGNAL RECEIVED FROM A REMOTE TRANSMITTER

TECHNICAL FIELD

The present disclosure relates to tracking a roll and a roll rate of a spinning projectile.

BACKGROUND

A projectile may spin rapidly about an axis while the projectile is in flight. The projectile may include an on-board guidance system to modify control surfaces of the projectile in order to steer the projectile precisely along a desired trajectory. The guidance system typically tracks yaw, pitch, and roll of the projectile and modifies the control surfaces accordingly. Traditional techniques used to track high roll rates of the spinning projectile are complicated and expensive to implement. Moreover, one such technique detects phase differences between signals received through multiple separated antennas fixed to a periphery of the projectile and separated sufficiently to generate noticeable phase differences; however, guided projectiles are often too small to accommodate the required antenna separation.

SUMMARY

Techniques described herein are used to track a roll rate and roll angle of a spinning projectile based on a signal from a satellite or terrestrial transmitter. A directional antenna fixed to the rotating projectile receives the signal and delivers the received signal to a receiver. The antenna has a receive pattern including a gain peak. The receiver tracks a code phase and a rate of change thereof of the received signal relative to a local model signal corresponding to the satellite. A roll correlator of the receiver correlates the received signal with the model signal based on (i) the tracked code phase and rate, and (ii) a roll-correlator integration time assumed to produce a predetermined number N of correlation samples per revolution of the antenna, to produce sequential correlation samples for each of successive revolutions of the antenna. A roll feedback loop of the receiver determines a period of observed signal reception corresponding to when a receive pattern of the antenna comes into view of the transmitter in each revolution based on the correlation samples for that revolution, determines a time difference between successive periods of observed signal reception, and determines a roll rate based on the time difference.

DETAILED DESCRIPTION

Figure 1A:
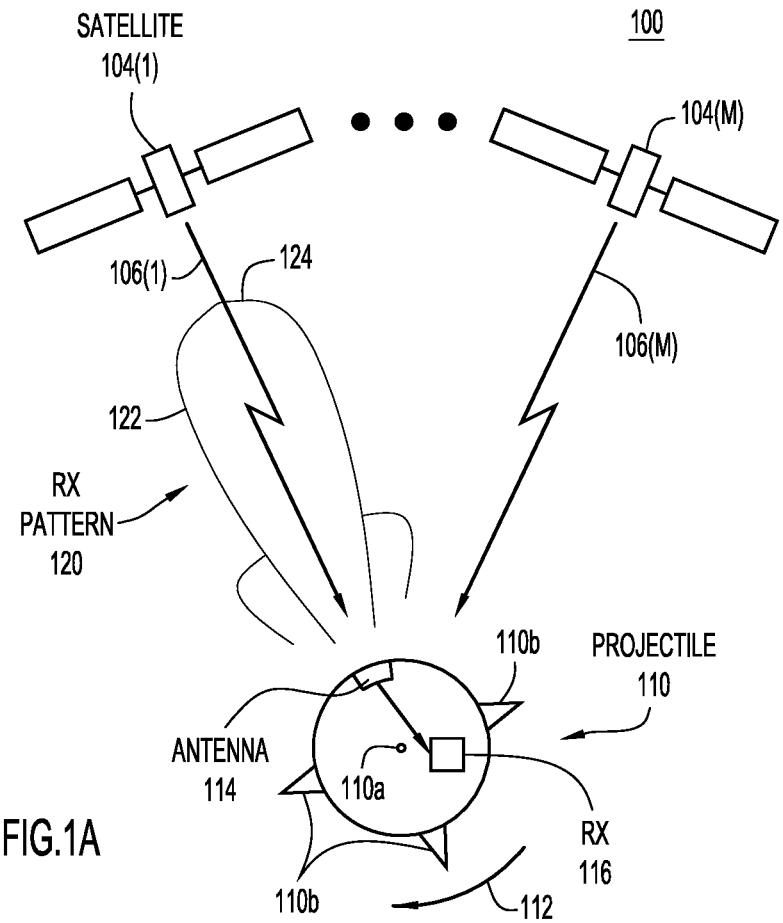
FIG. 1A is an illustration of an example operational environment including satellites and a spinning projectile in which techniques describe herein may be implemented.
Figure 1B:
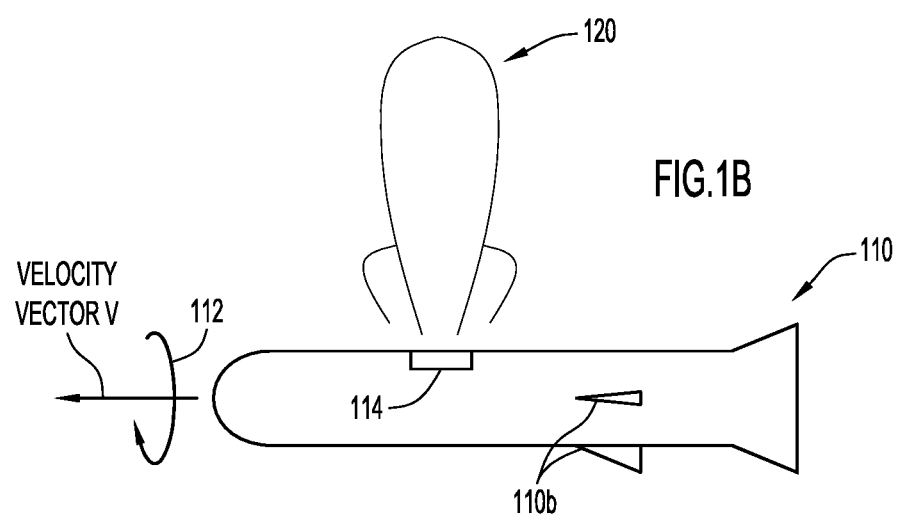
FIG. 1B is a side-view of the spinning projectile depicted in FIG. 1A.

With reference to FIG. 1A, there is depicted an illustration of an example operational environment 100 in which techniques describe herein may be implemented. Environment 100 includes a plurality of Global Positioning System (GPS) satellites 104(1)-104(M) that each transmit a corresponding one of GPS signals 106(1)-106(M) and a projectile 110 (depicted in a front cross-section view in FIG. 1A) spaced-apart from the satellites and that spins or rotates in a clockwise direction 112 about a center axis 110a while in flight. Satellites 104 are considered remote transmit sources or transmitters with respect to projectile 110. With reference to FIG. 1B, there is depicted a side-view of projectile 110, in which the projectile is depicted as flying in a direction of a velocity vector V while spinning Projectile 110 may be any flying and spinning object, including, but not limited to, a munitions projectile, a rocket, a satellite, and the like. Projectile 110 includes fins and/or control surfaces 110b, which may be manipulated by an on-board guidance control system (not shown).

Projectile 110 includes a directional antenna 114 fixed to an outer casing of the projectile so as to receive GPS signals 106. Antenna 114 delivers signals received at the antenna, including GPS signals 106, to a receiver system 116 (RX 116) on-board projectile 110. In the embodiment depicted in FIG. 1A, antenna 114 has a directional receive pattern 120 that includes a main lobe 122 and side lobes on either side of the main lobe. At an instant in time depicted in FIG. 1A, projectile 110/antenna 114 is rotated such that a gain peak or apex 124 of main lobe 122 is aligned with a line-of-site (LOS) between the projectile and satellite 104(1). While directional receive pattern 120 is depicted in FIG. 1A as having a pronounced gain peak due to its relatively high gain, the receive pattern may have a relatively low gain, i.e., may be relatively flat. The techniques described herein operate equally well with high gain receive patterns having pronounced gain peaks and low gain receive patterns that are relatively flat and do not have pronounced gain peaks.

In accordance with techniques described herein, RX 116 estimates a rate at which the projectile 110 is rotating (i.e., a roll rate of the projectile) and a roll angle of the projectile at a given instant in time based on amplitude characteristics of one or more received GPS signals (i.e., received signals) delivered to RX 116 by antenna 114 while the antenna rotates through successive revolutions. RX 116 takes advantages of the fact that as antenna 114 rotates through a revolution, the antenna rotates both into view of a satellite 104(i) (i.e., receive pattern 120 sweeps crosses the LOS to the satellite) during a first period of the revolution and then out of view of the satellite during a second period of the revolution (when the antenna is facing away from the satellite). As a result, antenna 114 delivers GPS signal 106(i) to receiver 116 during the first period (in which case the GPS signal is present in and thus observed by the receiver) and then the antenna does not deliver the GPS signal to the receiver during the second period (in which case the GPS signal is absent in and thus not observed by the receiver). RX 116 determines/detects the first period (in which the GPS signal is present) in each revolution as a period during which the signal delivered by antenna 114 exceeds a predetermined "signal present" amplitude threshold indicative of "observed signal" reception. The first period is referred to herein as the "period of observed signal reception." After RX 116 has determined the first period in each of successive revolutions (i.e., the receiver has determined successive periods of observed signal reception), the receiver then determines a period of revolution of antenna 114 (and thus of projectile 110) as a time difference between the successive periods of observed signal reception (i.e., the time difference between successive first periods). RX 116 determines the roll rate as an inverse of the period of revolution.

Figure 2:
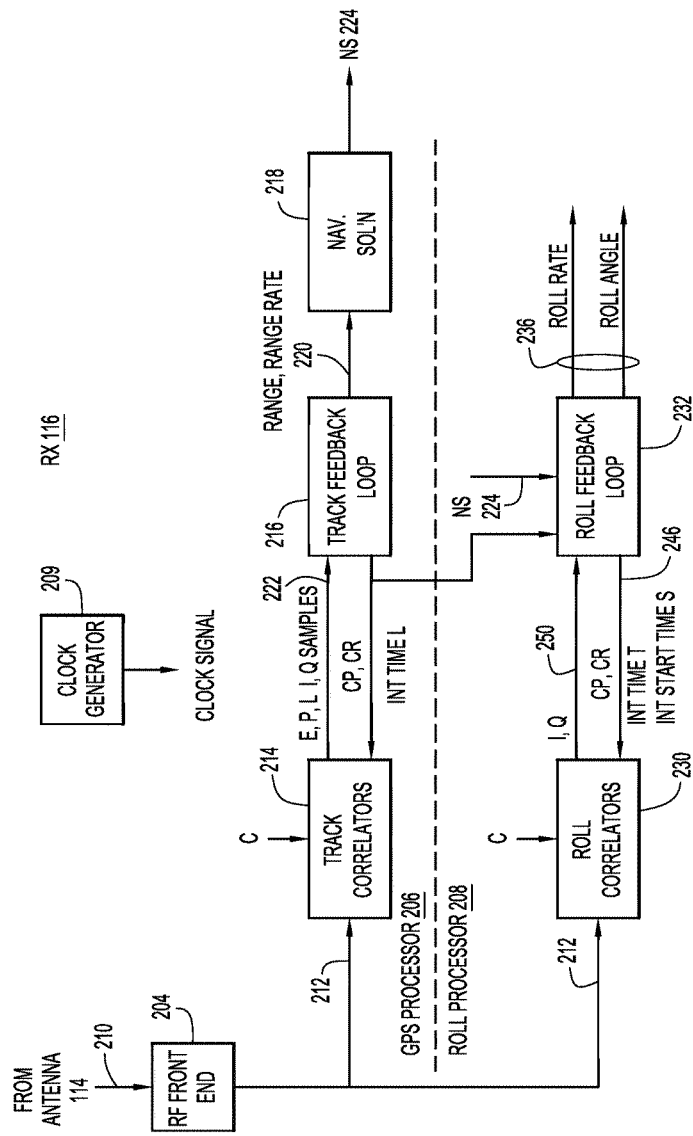
FIG. 2 is a block diagram of an on-board receiver system (RX) on the projectile configured to track a roll rate and a roll angle of the projectile based on satellite signals.

With reference to FIG. 2, there is depicted a block diagram of RX 116 to track the roll rate and roll angle of projectile 114, according to an embodiment. RX 116 includes an RF front end 204, a GPS processor 206 to derive a navigation solution based on GPS signals 106 using known techniques, a roll processor 208 to determine a roll rate and a roll angle for spinning projectile 114 based on the GPS signals according to techniques described below, and a clock generator 209 to produce clock signals used in GPS processor 206 and roll processor 208 as necessary to derive their respective timing signals.

Antenna 114 delivers to RF front-end 204 a received RF signal 210 including one or more of GPS signals 106. RF front end 204 frequency down-converts the RF signal 210 to a down-converted receive signal 212 at baseband or near-baseband frequencies. Down-converted receive signal 212 includes one or more of GPS signals 106 at down-converted frequencies. Front end 204 provides receive signal 212 (including the one or more GPS signals therein) to GPS processor 206 and roll processor 208.

GPS processor 206 includes track correlators 214, a track feedback loop 216, and a navigation solution module 218, which may be integrated with the track feedback loop. Track correlators 214 and track feedback loop 216 operate together as one or more GPS (code phase, range, and range rate) tracking feedback loops to derive one or more pairs of range and rate estimates 220 (one range/range rate pair per each tracked GPS satellite/signal). As is known, each of GPS signals 106 is a spread spectrum signal that is spread based on a corresponding spreading code and may be de-spread and tracked in a receiver using a de-spreading code (referred to herein as a "model signal") that matches the spreading code. Accordingly, each of track correlators 214 includes a corresponding one of model signals/de-spreading codes C with which the track correlator de-spreads a corresponding GPS signal in received signal 212 that was spread using the same code.

Track correlators 214 include sets of early (E), prompt (P), and late (L) correlators, where each set of E, P, and L correlators correlate (i.e., multiply and integrate over a sample/integration time) the matching GPS signal in received signal 212 with model signal C based on sample timing established by a code phase CP, a code rate CR (i.e., a rate of change of the code phase), and a correlator integration time L from feedback loop 216, to produce respective ones of E, P, and L I, Q samples 222. Integration time L is a relatively long integration time in the range of 1-20 milliseconds (ms), and typically may be set to 5 ms. Track correlators 214 provide I, Q samples 222 to track feedback loop 216. Track feedback loop 216 derives code phase CP and code rate CR based on I, Q samples 222 to close the track feedback loop.

Track correlators 214 provide range and range rate estimates 220 to navigation solution module 218. Navigation solution module 218 determines a navigation solution (NS) 224 for projectile 114 based on range and range rate estimates 220. Navigation solution 224 may include a position and velocity vector of projectile 114, and may be referenced to Cartesian coordinates x, y, z, for example. Navigation solution module 218 computes satellite positions as a prerequisite to determining navigation solution.

Roll processor 208 includes one or more roll correlators 230 (each matched to a corresponding one of GPS signals 106 in receive signal 212) followed by a roll feedback loop 232 that operate together as one or more roll tracking feedback loops that independently and concurrently track a roll rate and a roll angle of projectile 114 based on one or more GPS signals 106 in receive signal 212, to derive a pair of roll rate and roll angle estimates 236 (output by roll feedback loop 232). In an embodiment, roll processor 208 includes only one roll correlator matched to a corresponding one of GPS signals 106 in receive signal 212, and thereby derives only one pair of roll rate and roll angle estimates 236. In another embodiment, roll processor 208 includes multiple roll correlators each matched to a corresponding one of GPS signals 106 in receive signal 212, and thereby derives multiple pairs of roll rate and roll angle estimates (one per roll correlator/GPS signal) that the roll processor combines into a pair of combined estimates, including a composite roll rate estimate and a composite roll angle estimate represented in outputs 236. For example, roll processor may average each of the roll estimates and average each of the roll rate estimates in the multiple pairs of estimates received from roll feedback loop 232. Since received GPS signals are inherently noisy, combining multiple estimates into a solution may increases the reliability of final roll rate and roll angle estimates.

Roll correlators 230 each correlate the corresponding GPS signal in receive signal 212 with model signal C based on roll correlator timing signals 246, including (i) code phase CP and code rate CR (which may be provided from track feedback loop 216, or may derived within the roll feedback loops comprising the roll correlators and roll feedback loop 232), and (ii) a roll correlator integration time T and a roll integration start time S derived by roll feedback loop 232, to produce sequential roll correlation I, Q energy samples 250. Each of I, Q energy samples 250 (also referred to simply as I, Q samples 250) represents energy correlated/integrated over one roll correlator integration time T. In an embodiment, correlators 230 may store sequential I, Q samples 250 into sequential positions of an array accessible to roll feedback loop 232. Roll feedback loop 232 derives roll correlator integration time T and start time S based on I, Q samples 250 to close the feedback loop, as will be describe in detail below. In an embodiment, roll correlators 230 may perform multiple short integrate-and-dump operations per integration time T that produce multiple corresponding correlation outputs, which are accumulated into a final I, Q sample.

When roll processor 208 (e.g., roll feedback loop 232) is tracking the roll rate in a steady state, the roll processor (e.g., roll feedback loop 232) sets integration time T so that roll correlators 230 generate a target/predetermined number N of sequential I, Q samples 250 for each full 360° revolution of antenna 114/projectile 110. Thus, in the steady state, each I, Q sample (and each roll correlator integration time T) corresponds to energy integrated over an angle of rotation equal to 360°/N. Based on the predetermined number N and the (tracked) roll rate, integration time T is controlled such that (i) integration time T is short enough that each I, Q sample does not capture noticeable amplitude changes in the received GPS signal over that time frame that would otherwise be caused by an interaction between the rotation (and roll rate) of projectile 114 and the shape of antenna receive pattern 120, and (ii) the sample resolution (i.e., angular resolution of 360°/N) is fine enough to capture noticeable amplitude changes across multiple samples caused by the rotation in order to highlight transitions between a presence of satellite signal (i.e., signal present) and an absence of satellite signal (i.e., signal absent) as antenna 114 rotates, as discussed below.

In an example, the predetermined number N is 360 I, Q samples per revolution, so that each I, Q sample corresponds to energy collected over 1° of rotation. Assuming a tracked roll rate of 300 Hz (i.e., 300 rotations/second) in steady state, each period of rotation is approximately 3.3 milliseconds (ms). As a result, integration time T is set equal to 3.3 ms/360=approximately 10 microseconds (us). Typically, integration time T is at least one to two orders of magnitude less than GPS tracker integration time L (e.g., 5 ms).

As mentioned above, roll feedback loop 232 tracks the roll rate and roll of antenna 114 based on amplitudes of I, Q samples 250. To do this, roll feedback loop 232 identifies successive periods of observed signal reception (i.e., successive first periods when antenna 114 is in view of a given one of satellites 104 during successive rotations) as periods during which amplitudes of I, Q samples 250 exceed the predetermined signal present amplitude threshold. Roll feedback loop 232 determines a time difference between the successive periods of observed signal that is indicative of the roll rate. In an embodiment, roll feedback loop 232 determines a midpoint time in each of the successive periods of observed signal reception and then determines the time difference between the periods as the time difference between the successive midpoint times. Then, roll feedback loop 232 determines the roll rate as the inverse of the time difference. Roll feedback loop 232 also determines the roll angle relative to the LOS to the given satellite based on the I, Q samples 250, as will be described more fully below.

Figure 3:
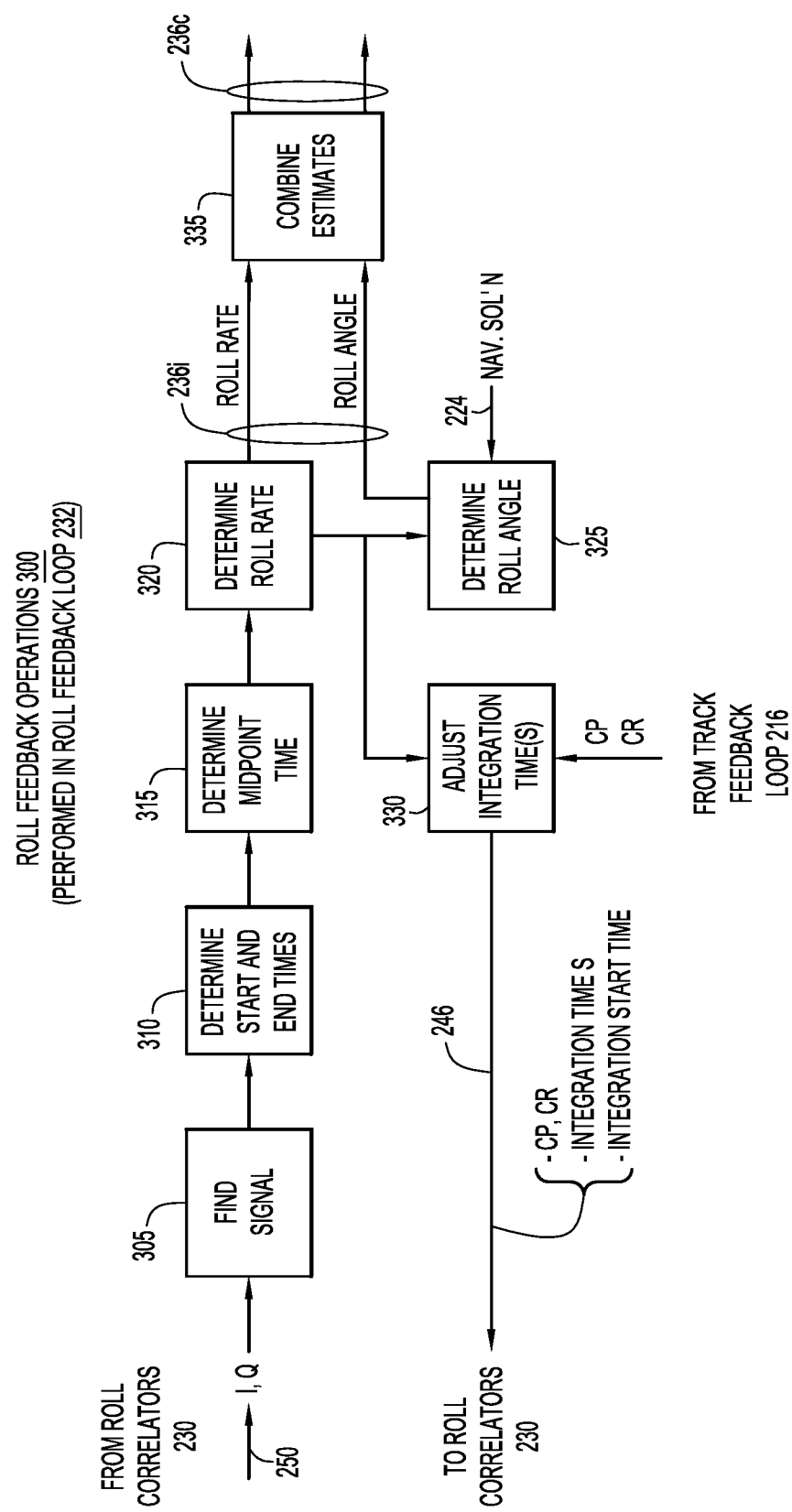
FIG. 3 is an example sequence of operations to perform roll rate tracking in a roll feedback loop of the roll tracker from FIG. 2.

With reference to FIG. 3, there is depicted an example sequence of operations 300 to perform roll tracking in roll feedback loop 232.

At 305, roll feedback loop 232 receives sequential I, Q samples 250 collected over successive revolutions of antenna 114. For example, feedback loop 232 may collect 2*N I, Q samples. Roll feedback loop 232 finds or detects where signal is present among the collected I, Q samples. To do this, roll feedback loop 232 applies the signal present amplitude threshold to each collected I, Q sample below and above which the feedback loop declares the I, Q sample to be noise and signal, respectively. It is assumed that I, Q samples 250 will have higher amplitudes in the case where signal is present anywhere in receive pattern 120 than where that is not the case. Thus, the signal present amplitude threshold is set to distinguish between these two cases. Operation 305 may dynamically adjust, i.e., increase and decrease, the signal present amplitude threshold as necessary to ensure there is a period in each revolution during which some of the samples are declared signal and another period during which some of the samples are declared noise.

Together, operation 305 and operation 310 (described below) find periods of signal or observed signal reception in each of successive revolutions, i.e., across the 2*N I, Q energy samples.

At 310, roll feedback loop 232 determines (i) a first pair of start and end I, Q samples declared to be signal among the I, Q samples of a first of the successive revolutions and their respective start and end times, and (ii) a second pair of start and end I, Q samples declared to be signal among the I, Q samples of a second of the successive revolutions and their respective start and end times. The start I, Q sample of each pair represents a transition/edge from noise (or no signal) on one side of the edge to signal on the other side of the edge due to the rotation of antenna 114 into view of a given satellite from which the signal originates. The end I, Q sample represents a transition from signal to no signal due to the rotation of antenna 114 out of view of the satellite. The I, Q samples between each start and end I, Q sample pair correspond to a period of observed signal reception. Note that roll feedback loop 232 may compute a time associated with a given I, Q sample that is offset from a start I, Q sample by a number of intervening samples according to the equation:

start time+(integration time $T$*number of intervening samples).

At 315, roll feedback loop 232 determines (i) a first midpoint time equidistant between the first pair of start and end times, and (ii) a second midpoint time equidistant between the second pair of start and end times. The first and second midpoint times may occur when antenna receive pattern 120 is generally centered on the LOS with a given tracked satellite, though this is not necessarily the case, during the first and second successive revolutions.

At 320, roll feedback loop 232 determines a roll rate of antenna 114 as an inverse of a time difference between the first and second midpoint times.

At 325, roll feedback loop 232 determines a roll angle at a current time as an angular offset from the LOS to the tracked satellite based on the above-mentioned parameters. At the current time, roll feedback loop 232 knows (i) a last midpoint time, and (ii) the determined roll rate. Roll feedback loop 232 determines the roll angle according to the equation:

(current time−last midpoint time)*determined roll rate.

The frame of reference for roll angle need not be the satellite LOS.

Roll feedback loop 232 may translate the determined roll angle relative to the LOS to a Cartesian coordinate reference frame based on navigation solution 224 and determined x, y, z positions of satellites 104 and projectile 114 based on known geometrical techniques.

Operations 320 and 325 output a pair of roll rate and roll angle estimates 236$i$ (where "i" denotes an individual (i.e., one) pair of estimates resulting from an individual tracked satellite).

At 330, roll feedback loop 232 tracks the roll rate. To do this, roll feedback loop 232 adjusts integration time T based on a difference between the actual number of I, Q samples collected per revolution and the predetermined number N expected to be collected. If roll feedback loop 232 determines that the actual number of I, Q samples collected between the successive midpoint times deviates from the predetermined number N of I, Q energy samples targeted for collection per revolution, the feedback loop adjusts integration time T accordingly to bring the actual number into alignment with the predetermined N over subsequent revolutions of antenna 114. For example, if the actual number of I, Q energy samples collected between the successive amplitude peaks is less than or more than N, roll feedback loop 232 decreases or increases integration time T in proportion to the difference between the actual number and N, respectively, to bring the two into alignment over time. The difference may be averaged over many revolutions to account for fractional differences (i.e., differences less than 1) between the actual number and N over a single revolution. Roll feedback loop 232 also adjusts the integration start time of each integration time T (i.e., a roll correlator sampling phase) based on code phase CP(i) and code rate CR(i) so that the I, Q samples are phase-aligned with the code phase of the tracked GPS signal and therefore represent a maximum correlated energy per sample. Note that in the embodiment depicted in FIG. 3, roll feedback loop 232 receives tracked code phase CP and code rate CR from track feedback loop 216; however, in another embodiment, roll feedback loop 232 tracks the code phase and code rate in cooperation with roll correlators 230 (independent of GPS processor 206), in which case the roll feedback loop need not receive the tracked inputs from the track feedback loop.

In an embodiment with multiple correlators 230, roll feedback loop 232 tracks multiple satellite signals (one per correlator) and replicates operations 300 for each tracked satellite signal. As a result, each pair of replicated operations 320 and 325 outputs a corresponding pair of roll rate estimates 236i per tracked satellite signal. At 335, roll feedback loop 232 combines the multiple pairs of estimates 236i into a pair of combined estimates 236c, including a combined roll rate estimate and a combined roll angle estimate (where "c" denotes "combined").

Embodiments described above include one roll correlator for one tracked satellite and multiple roll correlators for multiple tracked satellites. It is understood that only one roll correlator is required to determine roll rate and angle estimates using the techniques described herein. Also, an advantage of the techniques described herein, especially for small projectiles, is that only one antenna is required to deliver satellite signals to GPS processor 206 and roll processor 208; however, multiple antennas may be used in other embodiments.

While the techniques described herein by way of example only rely on GPS satellite signals, other embodiments may rely on satellite signals other than GPS satellite signals, such as Global Navigation Satellite System (GLONASS) and GALILEO navigation satellite signals. In other words, any satellite signal may be used to track the projectile roll rate in accordance with the techniques described herein. Additionally, the techniques herein may rely on a signal other than a satellite signal, such as a signal that originates from a terrestrially-based transmitter or an airborne-based transmitter.

Figure 4:
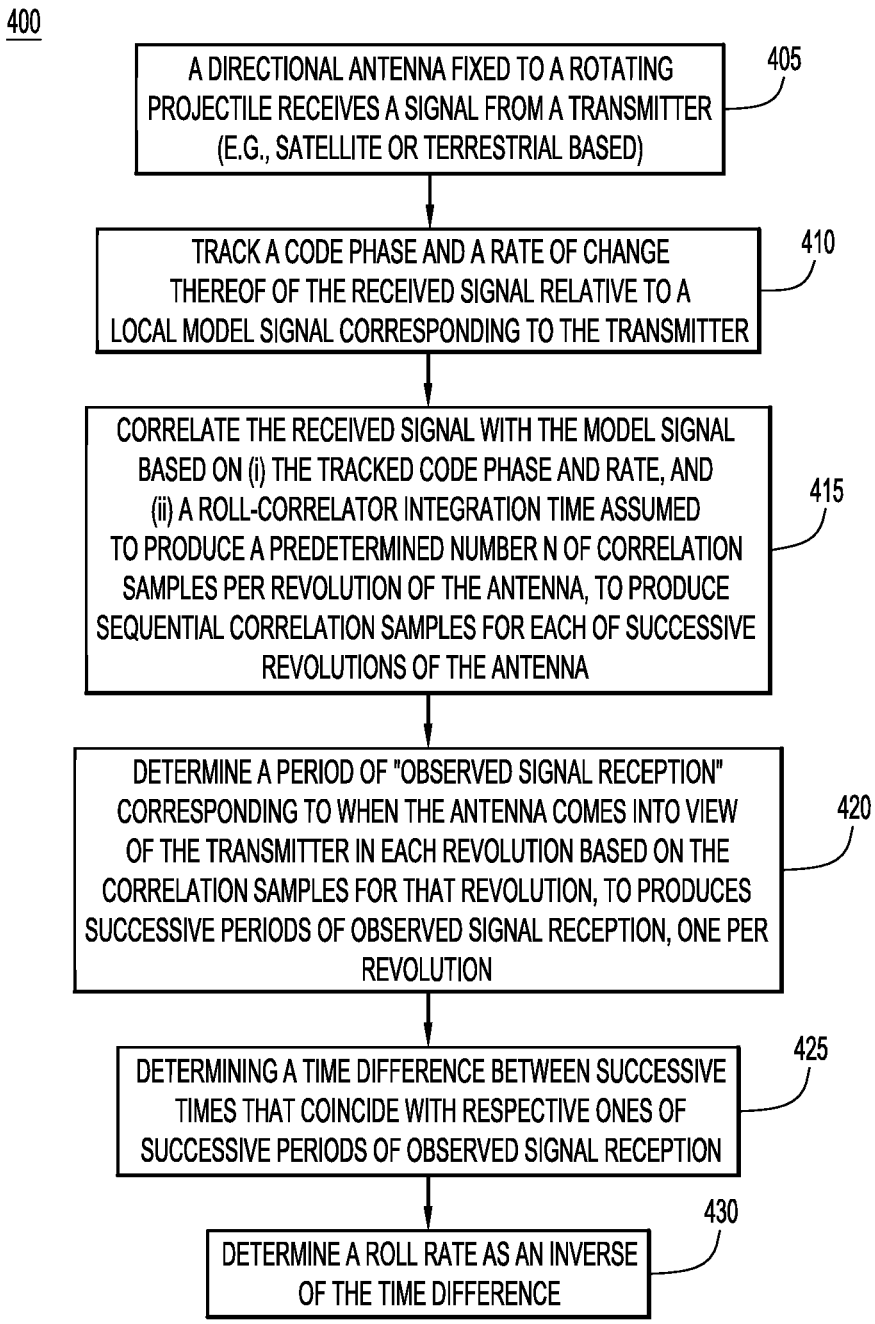
FIG. 4 is a flowchart an example method that summarizes operations used to determine a roll rate of the projectile in flight.

With reference to FIG. 4, there is depicted a flowchart an example method 400 that summarizes operations used to determine a roll rate of projectile 114.

At 405, directional antenna 114 fixed to rotating projectile 110 receives a signal from a satellite or a terrestrial transmitter. A variety of directional receive patterns of antenna 114 may be used, including high gain and low gain (i.e., relatively flat) patterns.

At 410, receiver system 116 tracks code phase CP and code rate CR of the received (spread spectrum) signal relative to local model signal C corresponding to the transmitter. Track feedback loop 216 and track correlators 214 may operate together to track code phase CP and code rate CR and/or roll feedback loop 232 and roll correlators 230 may operate together to track the code phase and rate.

At 415, one or more roll correlators 230 correlate the received signal with model signal C based on (i) the tracked code phase CP and rate CR, and (ii) roll-correlator integration time T assumed to produce a predetermined number N of correlation samples per revolution of the antenna, to produce sequential correlation samples for each of successive revolutions of the antenna.

At 420, roll feedback loop 232 determines a period of observed signal reception corresponding to when (the receive pattern of the antenna) comes into view of the transmitter in each revolution based on the correlation samples for that revolution. E.g., the period of observed signal reception is the period during which the correlation samples have amplitudes that exceed a predetermined observed signal reception amplitude threshold.

At 425, roll feedback loop 232 determines a time difference between (e.g., midpoint times of) of successive periods of observed signal reception.

At 430, roll feedback loop 232 determines a roll rate based on the time difference.

At 525, roll tracer 230(1) determines the roll rate based on the time difference.

Figure 5:
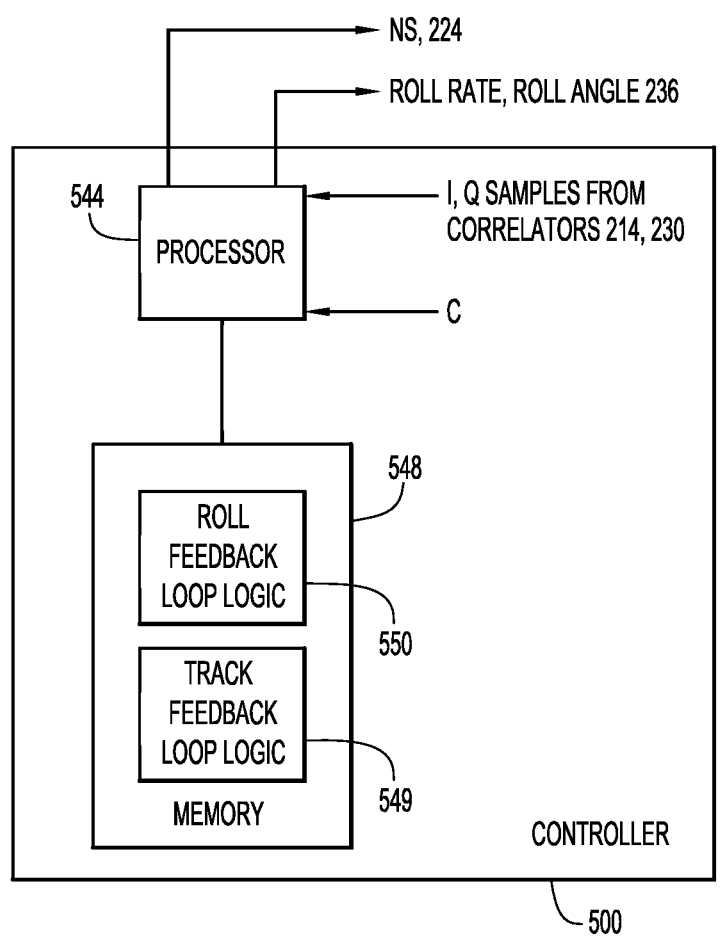
FIG. 5 is a block diagram of an example controller to perform operations to track the roll rate of the projectile.

Reference is now made to FIG. 5, which shows a block diagram of an example controller 500 to perform operations related to GPS processor 206 and operations 400 related to roll processor 208 to track the roll rate and roll angle of projectile 110. There are numerous possible configurations for controller 500 and FIG. 5 is meant to be an example. Controller 500 includes a processor 544 and a memory 548. Processor 544 (i) receives model signal/code C, and I, Q samples 222 and 250 from track correlators 214 and roll correlators 230, and (ii) derives roll rate and roll angle estimates 236 and navigation solution 224 based on the inputs (i). The processor 544 is a microcontroller, for example, configured to execute software instructions stored in the memory 548.

The memory 548 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 548 may comprise one or more computer readable storage media (e.g., a memory device) encoded with software comprising computer executable instructions and when the software is executed (by the processor 544) it is operable to perform the operations described herein. For example, the memory 548 stores or is encoded with (i) instructions for roll feedback loop logic 550 to perform operations 400 to track roll rate and roll angle, and (ii) instructions for track feedback loop logic 549 to track code phase CP and code rate CR, and derive range and range rate estimates (and a navigation solution). In addition, memory 548 stores I, Q samples and other information used and generated by logic 549 and 550.

In summary, in one form, there is provided a method, comprising: receiving a signal from a transmitter at a directional antenna fixed to a rotating projectile; correlating the received signal with a model signal based on (i) a tracked code phase and rate, and (ii) a roll-correlator integration time assumed to produce a predetermined number N of correlation samples per revolution of the antenna, to produce sequential correlation samples for each of successive revolutions of the antenna; determining a period of observed signal reception corresponding to when the antenna comes into view of the transmitter in each revolution based on the correlation samples for that revolution; determining a time difference between successive periods of observed signal reception; and determining a roll rate based on the time difference.

In another form, there is provided an apparatus, comprising: a directional antenna fixed to a rotating projectile and configured to receive a signal from a transmitter; a receiver configured to track a code phase and a rate of change thereof of the received signal relative to a local model signal corresponding to the transmitter, wherein the receiver includes: a roll correlator configured to correlate the received signal with the model signal based on (i) the tracked code phase and rate, and (ii) a roll-correlator integration time assumed to produce a predetermined number N of correlation samples per revolution of the antenna, to produce sequential correlation samples for each of successive revolutions of the antenna; and a roll feedback loop configured to: determining a period of observed signal reception corresponding to when a receive pattern of the antenna comes into view of the transmitter in each revolution based on the correlation samples for that revolution; determining a time difference between successive periods of observed signal reception; and determining a roll rate based on the time difference.

Although the apparatus and method are illustrated and described herein as embodied in one or more specific examples, it is nevertheless not intended to be limited to the details shown, since various modifications and structural changes may be made therein without departing from the scope of the apparatus and method and within the scope and range of equivalents of the claims. Accordingly, it is appropriate that the appended claims be construed broadly and in a manner consistent with the scope of the apparatus and method as set forth in the following claims.

What is claimed is:

1. A method, comprising:
   at a directional antenna fixed to a rotating projectile, receiving a signal from a transmitter that is spaced apart from the rotating projectile;
   tracking a code phase and a code rate of the received signal relative to a local model signal corresponding to the transmitter;
   correlating the received signal with the model signal based on the tracked code phase and the tracked code rate to produce sequential correlation samples per revolution of the directional antenna, such that each of successive revolutions of the directional antenna produces sequential correlation samples;
   determining, for each revolution, a period of observed signal reception corresponding to when the directional antenna comes into view of the transmitter, the determining including:
      determining first correlation samples having amplitudes above a threshold that indicate a presence of the received signal and second correlation samples having amplitudes below the threshold that indicate an absence of the received signal;
      determining a start time and an end time corresponding respectively to a first correlation sample having an amplitude above the threshold and a last correlation sample having an amplitude above the threshold among the first correlation samples; and
      determining a difference between the start time and the end time as the period of observed signal reception;
   determining a time difference between successive periods of observed signal reception; and
   determining a roll rate based on the time difference.

2. The method of claim 1, wherein the determining the time difference includes:
   determining a first midpoint time of a first of the successive periods of observed signal reception that falls within a first of the successive revolutions of the directional antenna;
   determining a second midpoint time of a second of the successive periods of observed signal reception that falls within a second of the successive revolutions of the directional antenna; and
   determining the time difference as a time difference between the first midpoint time and the second midpoint time.

3. The method of claim 2, wherein the determining the first midpoint time includes:
   determining the first midpoint time as a time equidistant between the start time and the end time.

4. The method of claim 2, further comprising determining a roll angle of the directional antenna relative to a line-of-sight to the transmitter corresponding to a given one of the sequential correlation samples in the first of the successive revolutions, wherein the roll angle is based on a number of correlation samples between the given correlation sample and a correlation sample corresponding to the first midpoint time.

5. The method of claim 4, wherein the determining the roll angle includes determining the roll angle as a ratio of the number of correlation samples between the given correlation sample and the correlation sample corresponding to the first midpoint time and 360°.

6. The method of claim 1, wherein:
   the correlating includes correlating the received signal also based on a roll-correlator integration time that is set to produce a predetermined N of the sequential correlation samples per revolution of the directional antenna; and
   if the correlating does not produce the predetermined number N of correlation samples per revolution, adjusting the roll-correlator integration time based on the roll rate so that the correlating will produce the predetermined number N of correlation samples per revolution.

7. The method of claim 1, wherein the correlating includes correlating the received signal also based on a roll-correlator integration time set to produce a predetermined N of the sequential correlation samples per revolution of the directional antenna, the method further comprising:
   determining a roll-correlation start time for each correlation sample based on the tracked code phase and the tracked code rate,
   wherein the correlating includes correlating the received energy over the roll-correlator integration time beginning with the roll-correlation start time, to produce each correlation sample.

8. The method of claim 1, wherein:
   the received signal is a spread spectrum signal; and
   the tracking includes correlating the received signal with the model spreading code for the received signal based on a track-correlator integration time that is at least an order of magnitude greater than a roll-correlator integration time.

9. The method of claim 1, further including:
   at the directional antenna, receiving a second signal from a second transmitter spaced apart from the rotating projectile;
   tracking a second code phase and a second code rate of the second received signal relative to a second local model signal corresponding to the second transmitter;
   correlating the second received signal based on the second tracked code phase and the second tracked code rate to produce second sequential correlation samples per revolution of the directional antenna, such that each of the successive revolutions of the directional antenna produces second sequential correlation samples;
   determining a second period of observed signal reception corresponding to when the directional antenna comes into view of the second transmitter in each revolution based on the second sequential correlation samples for that revolution;

determining a second time difference between successive second periods of observed signal reception; and determining a second roll rate based on the second time difference; and averaging the determined roll rate and the determined second roll rate, to produce an averaged roll rate.

10. The method of claim 1, wherein the receiving includes receiving the signal from a satellite-based transmitter.

11. The method of claim 1, wherein the receiving includes receiving the signal from a terrestrial-based transmitter.

12. An apparatus, comprising:
a directional antenna fixed to a rotating projectile and configured to receive a signal from a transmitter;
a receiver configured to track a code phase and a code rate of the received signal relative to a local model signal corresponding to the transmitter, wherein the receiver includes:
 a roll correlator configured to correlate the received signal with the model signal based on the tracked code phase and the tracked code rate to produce sequential correlation samples per revolution of the directional antenna, such that each of successive revolutions of the directional antenna produces sequential correlation samples; and
 a roll feedback loop configured to determine, for each revolution, a period of observed signal reception corresponding to when the directional antenna comes into view of the transmitter, wherein the roll feedback loop is configured to:
  determine first correlation samples having amplitudes above a threshold that indicate a presence of the received signal and second correlation samples having amplitudes below the threshold that indicate an absence of the received signal;
  determine a start time and an end time corresponding respectively to a first correlation sample having an amplitude above the threshold and a last correlation sample having an amplitude above the threshold among the first correlation samples; and
  determine a difference between the start time and the end time as the period of observed signal reception;
  determine a time difference between successive periods of observed signal reception; and
  determine a roll rate based on the time difference.

13. The apparatus of claim 12, wherein the roll feedback loop is further configured to:
determine a first midpoint time of a first of the successive periods of observed signal reception that falls within a first of the successive revolutions of the directional antenna;
determine a second midpoint time of a second of the successive periods of observed signal reception that falls within a second of the successive revolutions of the directional antenna; and
determine the time difference as the time difference between the first midpoint time and the second midpoint time.

14. The apparatus of claim 13, wherein the roll feedback loop is further configured to:
determine the first midpoint time as a time equidistant between the start time and the end time.

15. The apparatus of claim 13, wherein the roll feedback loop is further configured to determine a roll angle of the antenna relative to a line-of-sight to the transmitter corresponding to a given one of the correlation samples in the first of the successive revolutions, wherein the roll angle is based on a number of correlation samples between the given correlation sample and a correlation sample corresponding to one of the midpoint times.

16. The apparatus of claim 12, wherein:
the roll correlator is configured to correlate the received signal also based on a roll-correlator integration time that is set to produce a predetermined N of the sequential correlation samples per revolution of the directional antenna; and
if the roll correlator does not produce the predetermined number N of correlation samples per revolution, the roll feedback loop is configured to adjust the roll-correlator integration time based on the roll rate so that the roll correlator will produce the predetermined number N of correlation samples per revolution.

17. The apparatus of claim 12, wherein:
the roll correlator is configured to correlate the received signal also based on a roll-correlator integration time that is set to produce a predetermined N of the sequential correlation samples per revolution of the directional antenna;
the roll feedback loop is configured to determine a roll-correlation start time for each correlation sample based on the tracked code phase and the tracked code rate; and
the roll correlator is configured to correlate the received signal over the roll-correlator integration time beginning with the roll-correlation start time, to produce each correlation sample.

18. A method, comprising:
at a directional antenna fixed to a rotating projectile, receiving a Global Positioning System (GPS) signal from a GPS satellite spaced apart from the rotating projectile;
tracking a code phase and a code rate of the received GPS signal relative to a local model signal corresponding to the GPS satellite, wherein the tracking includes correlating the GPS signal with the model signal based on a track integration time per correlation sample;
correlating the received GPS signal with the model signal based on (i) the tracked code phase and the tracked code rate, and (ii) a roll-correlator integration time that is at least one order of magnitude less than the track integration time and set to produce a predetermined number N of sequential correlation samples per revolution of the antenna, such that each of successive revolutions of the directional antenna produces sequential correlation samples;
determining, for each revolution, a period of observed signal reception corresponding to when the directional antenna comes into view of the transmitter, the determining including:
 determining first correlation samples having amplitudes above a threshold that indicate a presence of the received signal and second correlation samples having amplitudes below the threshold that indicate an absence of the received signal;
 determining a start time and an end time corresponding respectively to a first correlation sample having an amplitude above the threshold and a last correlation sample having an amplitude above the threshold among the first correlation samples; and
 determining a difference between the start time and the end time as the period of observed signal reception;

determining a time difference between successive periods of observed signal reception; and determining a roll rate based on the time difference.

19. The method of claim 18, wherein:

if the correlating does not produce the predetermined number N of correlation samples per revolution, adjusting the roll-correlator integration time based on the roll rate so that the correlating will produce the predetermined number N of correlation samples per revolution.

* * * * *